Patented Oct. 21, 1941

2,259,695

UNITED STATES PATENT OFFICE 2,259,695

PREPARATION OF SULPHUR AND CHLORINE CONTAINING POLYMERS

Carl Max Hull, Chicago, Ill., assignor to Standard Oil Company, Chicago, Ill., a corporation of Indiana No Drawing. Application September 13, 1940, Serial No. 356,703

9 Claims. (Cl. 260—125)

The present invention relates to improvements in the preparation of halogen and sulphur-containing olefin polymers, particularly low molecular weight iso-olefin polymers, and to compositions containing the same.

Heretofore iso-olefin polymers have been treated with a sulphur chloride to obtain products which contain sulphur and chlorine, the latter, however, being present in relatively small quantities. Thus U. S. Patent 2,152,828 teaches the preparation of rubber-like products containing about 1.6% chlorine and about 1.3% sulphur by treating a high molecular weight—1000 to 300,000—polymer of isobutylene with sulphur chloride. Furthermore, the ratio of sulphur to chlorine which can be incorporated is limited by the ratio in which these constituents of the sulphur chloride react with the polymer. The present invention enables the incorporation of relatively large amounts of sulphur and chlorine or other halogens in polymers of the type defined without greatly increasing the molecular weight of the polymer.

It is an object of the present invention to provide a method of treating iso-olefin polymers chemically to combine therewith relatively large quantities of sulphur and halogen, particularly chlorine.

Another object of the invention is to provide a method of chemically combining in any desired ratio sulphur and chlorine in an iso-olefin polymer.

It is a further object of this invention to provide a composition of matter to be employed in lubricants for use under extreme pressure conditions.

Other objects and advantages of the invention will become apparent as the description thereof proceeds.

I have discovered that relatively large amounts of sulphur and halogen, particularly chlorine, in any desired ratio can be chemically combined with iso-olefin polymers, particularly low molecular weight iso-olefin polymers, such as for example the isobutylene polymers, iso-amylene polymers, etc., as well as the co-polymers of these iso-olefins with normal olefins, by subjecting such polymers to successive treatments with sulphur and a halogen, such as chlorine. Thus the polymer may be first sulphurized and subsequently halogenated or the polymer may be first halogenated and then sulphurized.

The preferred order in which the sulphurization and halogenation reactions are carried out will depend upon the type of product desired. During the second step of the process there will be a tendency toward removal of a certain amount of the reagent introduced during the first step. Thus if the sulphurization precedes chlorination there will be a tendency in the second stage of the process to remove some of the sulphur, particularly the less firmly bound sulphur, introduced during the first stage. Vice versa, if chlorination precedes sulfurization, the tendency will be to remove some of the less stably bound chlorine during the second stage of the reaction. The product obtained in the former case will tend to be more stable with respect to sulphur, whereas the product in the latter case will tend to be more stable with respect to chlorine.

I prefer to employ low molecular weight polymers, that is, polymers in which the molecular weight ranges from about 100 to about 1500. These polymers may be obtained, for example, by polymerizing in liquid phase iso-olefins such as isobutylene or hydrocarbon mixtures containing the same at a temperature of from about 0° F. to about 100° F. in the presence of a catalyst such as boron fluoride, aluminum chloride, zinc chloride or other similar active halide catalyst of the type employed in the Friedel-Crafts reaction. The polymer so obtained may per se be successively chlorinated and sulphurized or the polymer may be fractionated and the various fractions so treated.

In the preparation of the low molecular weight polymers I may employ, for example, liquid isobutylene or a hydrocarbon mixture containing the same such as a butane-butylene fraction recovered from petroleum gases, especially those gases produced in the cracking of petroleum oils for the manufacture of gasoline. This light fraction may contain from about 10% to about 25% isobutylene, the remainder being principally butanes and normal butylene. The preparation of low molecular weight polymers from the butane-butylene fraction may be carried out as follows: Hydrocarbon mixture containing 10% to 25% isobutylene is maintained under pressure sufficient to keep it in the liquid phase and cooled to a temperature of, for example, about 32° F. and from about 0.1% to about 2% boron fluoride, based upon the isobutylene content of the material treated, added with vigorous agitation. Excessive rise in the temperature due to the heat of reaction may be avoided by efficient cooling. After the polymerization of the isobutylene together with a relatively minor amount of the n-olefins present, the reaction mass is neutralized and washed free of acidic substances arising from the catalyst, the oily layer is separated, and the polymer subsequently separated from the unreacted hydrocarbons by distillation. The polymer mixture so obtained, depending upon the temperature of reaction, varies in consistency from a light liquid to a viscous oily material and contains polymers having molecular weights ranging from about 100 to about 1500.

Although my invention contemplates the treatment of these low molecular weight polymers by successive halogenation, preferably chlorination, and sulphurization, I prefer to fractionate the polymer under reduced pressure into fractions of increasing molecular weights, e. g., a dimer fraction, a trimer fraction, etc. As the base stock for the chlorination and sulphurization steps I prefer to use fractions corresponding to isobutylene trimers to isobutylene pentamers. The low molecular weight isobutylene polymers have the following approximate boiling point and gravity characteristics:

| Polymer | Boiling point, °F. | Gravity °A. P. I. |
| --- | --- | --- |
| Dimer | 215 | 64 |
| Trimer | 350 | 50 |
| Tetramer | 475 | 45 |
| Pentamer | 1 570 | 40 |
| Hexamer | 2 635 | 37 |

1 300° F. at 7 mm.
2 320° F. at 2.5 mm.

The respective fractions of isobutylene-n-butylene co-polymers have approximately the same characteristics having, however, slightly higher boiling points and gravities.

The low molecular weight polymer obtained, for example, as described above is successively treated with a sulphurization agent, such as sulphur, and a halogenating agent, for example chlorine, to obtain a product having chemically combined sulphur and chlorine. By successively halogenating and sulphurizing is meant the treatment of the polymer first by halogenation followed by sulphurization, or first by sulphurization followed by halogenation.

Successive halogenation and sulphurization may be carried out as follows:

The low molecular weight polymer obtained, for example, as described above, is first chlorinated for example, by passing chlorine gas into the polymer while agitating and cooling the same by suitable means so that the temperature does not rise excessively. The reaction may suitably be carried out at temperatures from about 0–200° F. The excess chlorine and HCl formed in the reaction may be removed by bubbling an inert gas or air through the mixture. The chlorination may be continued until the product contains from about 5% to about 30% combined chlorine. The chlorinated polymer may then be sulphurized, for example, by heating with sulphur as described below.

The chlorination procedure should be such as to give a substantial proportion of substituted chlorine, thus leaving the double bond of the polymer free to react readily with sulphur. With a polymer of the type obtained by polymerization of isobutylene-containing mixtures, such as the polymer described above, the conditions of chlorination are not particularly critical since there is a considerable tendency toward substitution regardless of conditions of chlorination. With some polymers, however, particularly the less highly branched type, it may be desirable to chlorinate at somewhat higher temperature, say as high as 300–600° F., in order to favor substitution, since the amount of sulphur which may be conveniently introduced increases with unsaturation.

The sulphurization may be accomplished by treating the polymer or chlorinated polymer with elemental sulphur at a temperature range of about 300° F. to about 450° F. and preferably at a temperature of about 325° F. to about 375° F., until the sulphur has combined chemically with the polymer. The amount of sulphur which will combine with the polymer depends largely upon the amount of elemental sulphur used, the temperature employed, the time of reaction and, in the case of polymer which has previously been chlorinated, on the amount of combined chlorine, and the per cent unsaturation. At a temperature of about 325 to 375° F. from about 5% to about 20% sulphur can be combined with the low molecular weight butylene polymers in about 2 to 15 hours.

The halogenated polymer may be sulphurized by other means such as by treatment with a sulphur halide, for example sulphur chloride or sulphur dichloride.

The process herein described may be used to produce sulphurized halogenated polymers or halogenated sulphurized polymers having any desired ratio of Cl to S in the product. Thus the properties of the product may be controlled with respect to desirable oiliness and extreme pressure characteristics on the one hand and undesirable corrosiveness on the other.

The sulphurized halogenated products may be used as effective extreme pressure agents when blended with lubricating oils in concentrations of about 0.5% to about 20% or as cutting oils. They are also suitable as oiliness agents for lubricating oils. They may also be added to lubricants with other constituents which serve other purposes, such as pour point depressors, antioxidants, sediment dispersers, soaps, etc., and the like.

I claim:

1. The method of preparing an olefin polymer derivative having chemically combined therein halogen and sulphur comprising successively halogenating and sulphurizing said olefin polymer.

2. The method of preparing an iso-olefin polymer derivative having chemically combined therein halogen and sulphur comprising successively halogenating and sulfurizing said iso-olefin polymer.

3. The method of preparing a derivative of a co-polymer of an iso-olefin and a normal olefin having chemically combined therein halogen and sulphur comprising successively halogenating and sulphurizing said co-polymer.

4. The method of preparing an isobutylene polymer derivative having chemically combined therein halogen and sulphur comprising successively halogenating and sulphurizing said isobutylene polymer.

5. The method as described in claim 4 in which the isobutylene polymer has a molecular weight less than about 1500.

6. The method of preparing a low molecular weight isobutylene polymer derivative having chemically combined therein chlorine and sulphur comprising passing gaseous chlorine into the polymer until the chlorinated polymer contains from about 5% to about 30% chlorine, removing excess chlorine and other gaseous reaction products and subsequently treating the chlorinated polymer at a temperature of from about 300° F. to about 400° F. in the presence of elemental sulphur until substantially all of the sulphur is chemically combined with said chlorinated polymer.

7. The method of preparing a low molecular weight isobutylene-normal butylene co-polymer derivative having chemically combined therein chlorine and sulphur comprising passing gaseous chlorine into the polymer until the chlorinated polymer contains from about 5% to about 30% chlorine, removing excess chlorine and other gaseous reaction products and subsequently treating the chlorinated polymer at a temperature of from about 300° F. to about 400° F. in the presence of elemental sulphur until substantially all of the sulphur is chemically combined with said chlorinated polymer.

8. The method of preparing a polymer derivative comprising treating a low molecular weight olefin polymer with elementary chlorine until the chlorinated polymer contains from about 5 to about 30% chlorine, a substantial proportion of which has been substituted for hydrogen in the original polymer, removing excess chlorine and other gaseous reaction products, mixing elemental sulphur with said chlorinated polymer to the extent of 5 to 20% of the mixture, and heating said mixture at a temperature of about 300 to 400° F. until substantially all of the sulphur is chemically combined with the chlorinated polymer.

9. The method of claim 8 in which the low molecular weight olefin polymer is a polymer derived by the polymerization of a mixture of four carbon hydrocarbons obtained from a cracking operation, said polymer having a molecular weight less than 1500.

CARL MAX HULL.